United States Patent [19]

Miller

[11] 4,013,212

[45] Mar. 22, 1977

[54] SOLDERING METHOD

[75] Inventor: Imrich M. Miller, Paterson, N.J.

[73] Assignee: Universal Manufacturing Corporation, Paterson, N.J.

[22] Filed: Jan. 21, 1972

[21] Appl. No.: 219,661

[52] U.S. Cl. .............................. 228/203; 228/262; 228/240; 228/902; 228/904

[51] Int. Cl.$^2$ .......................................... B23K 1/08

[58] Field of Search .................... 29/503, 628, 488; 81/9.5; 228/904, 203, 262, 240, 902, 904

[56] References Cited

UNITED STATES PATENTS

| | | | |
|---|---|---|---|
| 2,116,228 | 5/1938 | Akin, Jr. | 81/9.5 C X |
| 2,620,692 | 12/1952 | Marshall | 81/9.5 C |
| 2,751,317 | 6/1956 | Orme | 29/495 X |
| 2,824,543 | 2/1958 | Brown | 29/503 X |
| 3,084,650 | 4/1963 | Johns | 29/488 X |
| 3,100,471 | 8/1963 | Gutbier | 29/503 X |
| 3,266,136 | 8/1966 | Gutbier | 29/503 X |
| 3,500,533 | 3/1970 | Sparling | 228/902 X |
| 3,536,243 | 10/1970 | Higgins | 29/503 X |
| 3,673,681 | 7/1972 | Steranko | 29/628 X |

FOREIGN PATENTS OR APPLICATIONS

| | | | |
|---|---|---|---|
| 448,282 | 5/1948 | Canada | 29/488 |
| 525,597 | 8/1940 | United Kingdom | 29/628 |

*Primary Examiner*—Ronald J. Shore
*Attorney, Agent, or Firm*—Darby & Darby

[57] ABSTRACT

An improved method and apparatus for forming an electrical connection between electrical conductors by soldering. A lead wire with a coating of insulating material has a selected portion of the coating removed by a flame from a torch. The bared portion of the lead wire is wrapped around a second conductor such as a terminal, and the two conductors are then immersed in a low temperature, ultrasonically agitated liquid solder bath. The terminal also can have insulation which is burned off by the flame before the soldering takes place. The insulation on the lead wire can be burned off when it is wrapped around the terminal.

6 Claims, 6 Drawing Figures

SOLDERING METHOD

In the past, various methods and devices have been used in an attempt to efficiently and economically achieve a reliable soldered electrical connection between two electrically conductive elements. The most common of these methods has been to first strip any insulation from the conductors at the place where soldering is to take place, place the bared portions of the conductors in physical contact with each other and then apply sufficient heat to melt a solder and to remove the oxides from the conductors so as to form an electrical connection.

The insulation may be of any of the conventional types known in the art, including polyethylene, polyethylene with a mixture of nylon, polyesters, oleo films or paper. Many of these materials, and particularly the synthetic ones, are applied as coatings to the conductor which can be, for example, a lead wire. The insulation may be removed from the portion of the conductor which is to be soldered in a variety of ways, the most common being cutting the insulation and physically stripping it from the conductor. Other methods, such as are described in U.S. Pat. No. 3,527,138, include etching the insulation away with chemicals, or melting it with an induction-heated rotary tool. The patent also discloses removal of the insulation by air abrasion through the use of fine aluminum grits, rotary "cookie" cutters, or machine-operated spot facers. Micro-torches have also been used to remove insulation from a large, flat conductive surface; however, this procedure requires multiple passes with the flame to remove all of the insulation.

Several methods for making an electrical connection between two conductors once they have been stripped are also known. U.S. Pat. No. 2,250,156 discloses physically crimping or welding a conductive metal sleeve around two conductors, with or without insulation, to maintain the conductors in electrical contact. U.S. Pat. Nos. 3,314,582 and 3,384,283 use ultrasonic vibrations, without any solder, to form a bond between two conductors.

The previously known methods and apparatus for soldering two conductors, particularly where one is a terminal around or on which a lead wire is to be crimped or wrapped, have distinct disadvantages, especially for high-speed soldering. The apparatus of U.S. Pat. Nos. 3,314,582 and 3,384,283 are bulky, slow and expensive and have limited application to soldering other than miniature components. The sleeve-type devices are also bulky, slow and relatively expensive to apply, and may cause physical damage to the electrical conductors, thereby possibly creating weak spots, high resistivity points or poor electrical connections. The conventional soldering technique of using a hot soldering iron to melt solder to form a connection is also relatively slow and inefficient. In addition, a soldering iron must generate large amounts of heat, in the order of 700° F, so as to "wet" or remove the oxides from the conductors produced when the insulation is put on the conductor, so that the solder bond can be made. This heat may damage the insulation of other conductors in close proximity to the conductors to be joined or may damage electrical components adjacent or attached to the conductors. The high heat generated by the soldering iron also causes substantial amounts of impurities, or "scum" to form in the solder, creating the possibility of an imperfect electrical connection. These impurities form due to the creation of the oxides of the soldering compositions.

A further disadvantage of the previous soldering methods is that they do not lend themselves to high speed assembly line production.

It is therefore an object of this invention to provide a method and apparatus for producing an electrical connection between two or more electrical conductors that is rapid and efficient and produces reliable connections.

A further object is to provide a soldering method that is simple and inexpensive and does not require bulky equipment.

Another object is to provide a method and apparatus for soldering that permits soldering to be performed at lower temperatures than previously available, thereby preventing unnecessary damage to insulation or components.

An additional object is to provide a method and apparatus for preventing residue or scum from the soldering composition from forming during the joinder of conductors.

An additional object is to provide a method and apparatus for soldering that lends itself for use on an assembly line.

Another object is to provide a method and apparatus for soldering that reduces the possibility of physical damage to the conductors being joined and adjacent component.

Finally, another object is to provide a method of soldering that removes oxides or impurities from the conductive surfaces prior to joinder to form more reliable connections.

In accordance with the practice of the invention, an electrical conductor with an insulational film is wrapped around either an electrical terminal post or another conductor. The open flame from a torch is then used to melt the insulation from the insulated conductor at a selected area. The bared portions of the two conductors are then immersed in a heated ultrasonically agitated liquid solder bath to form the soldered connection. The temperature of the liquid solder bath can be kept low, for example, at 400° F. This minimizes the possibility of damage and also reduces the formation of oxides which adversely effects the reliability of the solder joint.

For a better understanding of the present invention together with other and further objects thereof, reference is made to the following description taken in connection with the accompanying drawings, and the scope of the invention will be pointed out in the appended claims. In the drawings:

Figure 1:
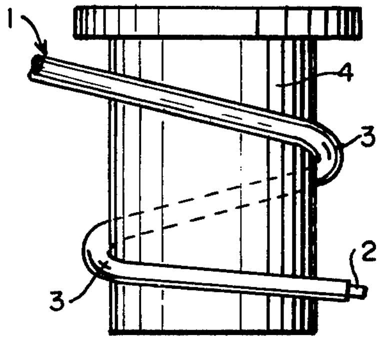
FIG. 1 is an enlarged front view of an insulated conductor wire attached to an electrically conductive terminal post.
Figure 6:
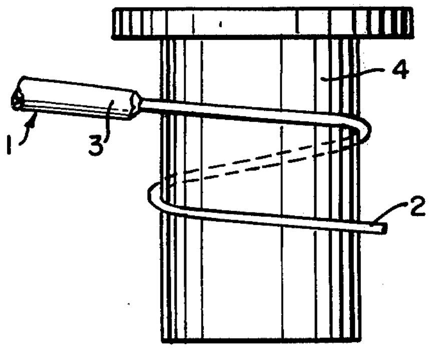

FIG. 6 is an enlarged front view of a conductor with its insulation partially removed attached to a terminal post. Referring to FIG. 1, a portion of a lead wire 1 is shown made up of a central conductor 2 which can be of copper, aluminum or other conductive material. The wire is coated with insulation 3 which can be of polyethelene, paper or any other suitable material. The wire 1 with insulation 3 is shown wrapped around a conductive terminal post 4 which can be, for example, on a terminal board or a terminal attached to a component.

Figure 2:
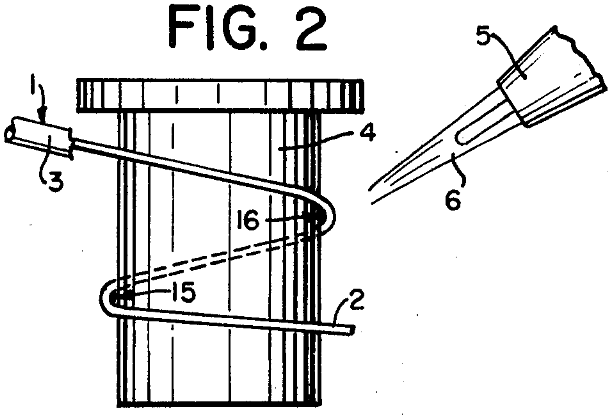
FIG. 2 is an enlarged front view of an electrical conductor wire attached to a conductive terminal post with the insulation of the conductor wire being partially removed by a flame.
Figure 3:
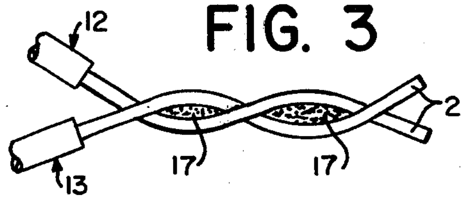
FIG. 3 is an enlarged front view of two conductor wires with their insulation partly removed.
Figure 4:
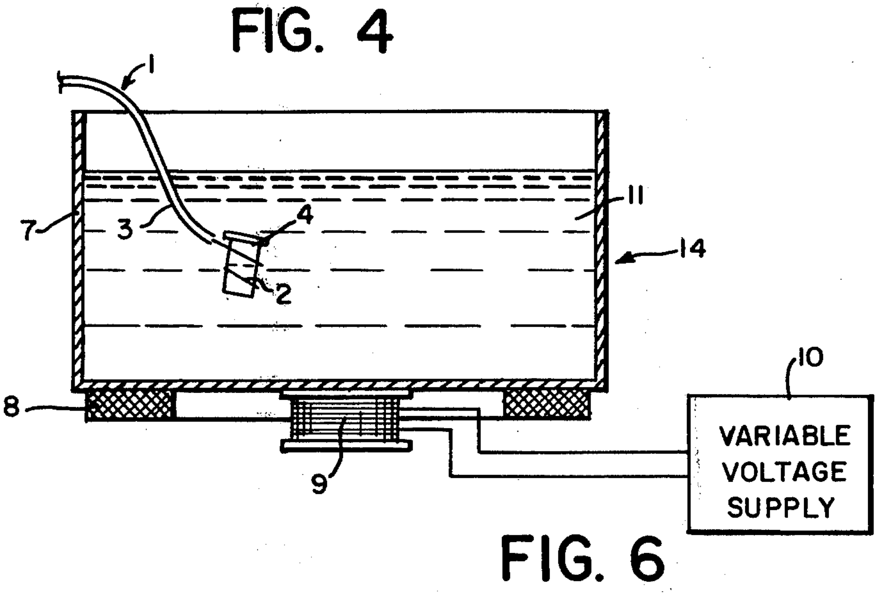
FIG. 4 is a cross-sectional view of a conductor and a conductive terminal post immersed in a heated ultrasonically agitated liquid solder bath.

FIG. 2 shows the removal of the insulation 3 from the lead wire 1. This is accomplished by melting the insulation 3 with the flame 6 of torch 5. The flame is produced by a torch that is preferably capable of forming a flame with a narrow tip. The flame temperature is hot enough to melt the insulation and burn it away. Thus, the flame temperature depends upon the type of insulation and its melting point. Many insulating materials have a relatively low melting point, for example, silicone rubber melts at 500° F. Suitable fuels are natural gas and oxy-acetelene. The latter is preferred since it produces a hot enough flame to melt most insulation materials normally used with electrical conductors. The hot flame melts the insulation quickly and without damaging the adjacent components if it is properly shaped and directed. Also, the terminal post serves as a heat sink.

All of the insulation may not be completely melted by the flame since some spots of insulation, such as 15 and 16 at the corners of the terminal post and between the post and the exposed surface of the conductor 2 are shielded from the flame. It has been found that these spots of insulation do not impair the reliability of the electrical connection formed. Sufficient contact is still made between the electrical conductor 2 and the terminal post, so as to ensure a reliable electrical connection.

After the insulation has been burned away, the conductive terminal post 4 with the wrapped lead wire are then immersed in a heated ultrasonically agitated liquid solder bath 14, completing the operation. The temperature of the solder bath may be relatively low, for example, about 400° F, depending on the composition of the solder used. This is compared with a normal soldering temperature of about 700° F where a solering iron is used. Table I gives the melting points for the most frequently used compositions of solder. The temperature of the bath must of course be the minimum at which the solder becomes liquid. For example, Solder ASTM No. 50A, the most popular solder used, would have to be heated to a temperature of at least 421° F, while Solder ASTM No. 35A would have to be heated to 477° F.

TABLE I

| ASTM No. | Use | Chemical composition, percent Sn | Pb | Sb | Melting range, deg F Liquid |
|---|---|---|---|---|---|
| 70A | Coating metals | 70 | 30 | — | 378 |
| 60A | "Fine solder" for general purposes | 60 | 40 | — | 374 |
| 50A | General purpose, most popular | 50 | 50 | — | 421 |
| 45A | Automobile radiators, roofing | 45 | 55 | — | 441 |
| 40A | Wiping solder, radiators, lead pipe | 40 | 60 | — | 460 |
| 40C | Same as 50A | 40 | 58 | 2 | 448 |
| 35A | Wiping solder, general purpose | 35 | 65 | — | 477 |
| 35C | Wiping solder, general purpose | 35 | 63.2 | 1.8 | 470 |
| 30A | Machine and torch soldering | 30 | 70 | — | 491 |
| 30C | Machine and torch soldering | 30 | 68.4 | 1.6 | 482 |
| 25A | Machine and torch soldering | 25 | 75 | — | 511 |
| 25C | Machine and torch soldering | 25 | 73.7 | 1.3 | 504 |

As a result of the ability to use lower temperatures, the insulation next to the terminal will not melt. Also, the temperature is low enough so as not to cause heat damage to any electrical components, such as transistors, attached to the electrical conductor wire 1.

Any suitable, conventional heat source may be used to melt the solder in the bath such as an open flame or an electric heating element. In the preferred embodiment, an electrically operated heating element 8 is located beneath the container 7 for the solder 11. The solder is agitated by a conventional ultrasonic vibrating means, such as a piezoelectric crystal, located below the container for the liquid solder bath. The ultrasonic vibration preferably is about 90 Kilohertz, although ultrasonic energy is generally considered to be in the range from 100 Hz to 100 Kilohertz in which range a suitable frequency can be used. The ulrasonic energy agitates the liquid solder producing microscopic bubbles (cavitation) which disintegrates dirt particles and removes any oxides remaining on the bared conductor 2 on the terminal post. The generator for the ultrasonic transducer has a variable frequency control permitting variation in the frequency of the ultrasonic vibrations to permit selection of the most effective frequency for removing the particular oxides produced when the insulation is burned off.

It is important in soldering that the oxides of the metal conductors (lead wire and terminal post) be removed so as to permit bonding to take place directly between the conductive materials themselves. The ulrasonic vibrations by cavitation remove these oxides and permit the bonding to occur at lower temperatures. The ultrasonic agitation also serves the purpose of cleaning any residue of the insulation 3 that may remain on the conductive core 2 after exposure to the flame.

Figure 5:
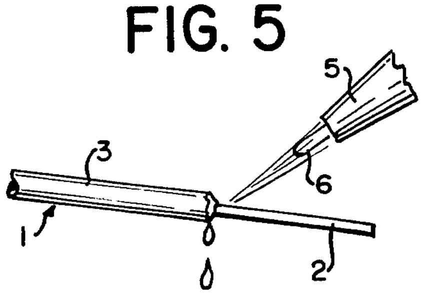
FIG. 5 is an enlarged front view of a conductor with its insulation being removed from a free end by a flame.

In another embodiment of the invention, as shown in FIGS. 5 and 6, the insulation 3 of the wire lead 1 may be removed by the use of the torch flame prior to the conductor wire being wrapped around the conductive terminal post. The conductors are then immersed in the ultrasonically agitated liquid solder bath in the same manner as in the preferred embodiment.

The above invention is particularly suitable for application on an assembly line. In such a practice, in accordance with the preferred embodiment, a number of "stations" will be provided along the length of a conveyor belt. At each station a single operation will be performed. As an example, the procedure of soldering lead wires from a ballast to terminal posts will be explained. At the first station the ballast will be placed in an appropriate workpiece holder and the lead wires will be extended and separated, ready for the next operation. At the next station the lead wires will be wrapped around a terminal post either by machine or manually. The workpiece holder will then travel to a station where an open flame will melt the insulation off the conductor wire in the area of the terminal post. Finally, the workpiece holder carries the ballast and the terminal posts to the liquid solder pool, immersing the portions selected to be soldered in the pool. The entire operation is extremely fast and requires a minimum of personnel.

While there have been described what are considered to be the preferred embodiments of the invention, it will be obvious to those skilled in the art that various changes and modifications may be made therein without departing from the invention, and it is, therefore, aimed to cover all such changes and modifications as fall within the true spirit and scope of the invention.

What is claimed is:

1. A method for forming an electrical connection between an uninsulated electrical terminal of electrically conductive material and an electrical conductor which has electrical insulation thereover comprising the steps of bringing a portion of said conductor having insulation thereon adjacent said uninsulated terminal and holding the conductor to the terminal, applying heat from a flame of a temperature above the melting point of the insulation to a selected area of said conductor adjacent said terminal to remove the insulation from said area while said conductor is held to the terminal in an air environment, and immersing the terminal with the electrical conductor held thereto in an ultrasonically agitated bath of liquid solder to solder them together with the solder connection being made in at least a portion of the area of the conductor where the insulation was removed.

2. The method of claim 1 wherein the flame is produced by a blow torch.

3. A method as in claim 1 wherein the temperature of the ultrasonic bath is maintained below the melting point of the insulation.

4. A method as in claim 1 wherein the temperature of the solder bath is at about 400° F.

5. A method as in claim 1 wherein the flame is produced by burning natural gas.

6. A method as in claim 1 wherein the flame is produced by burning oxy-acetylene gas.

* * * * *